United States Patent [19]

Healy

[11] 3,852,943

[45] Dec. 10, 1974

[54] PORTABLE SAFETY CLAMP

[75] Inventor: Gerald S. Healy, Red Wing, Minn.

[73] Assignee: Meyer Industries, Inc., Red Wing, Minn.

[22] Filed: Aug. 27, 1973

[21] Appl. No.: 391,575

[52] U.S. Cl. ................. 24/134 R, 24/254, 182/5, 16/189
[51] Int. Cl. ................. F16g 11/00, F44b 21/00
[58] Field of Search ............... 24/134 R, 134, 254; 188/65.1, 65.2, 65.3, 65.4, 65.5; 182/5; 16/189; 294/104

[56] References Cited
UNITED STATES PATENTS

| 673,679 | 5/1901 | Foster | 24/134 R |
|---|---|---|---|
| 1,282,643 | 10/1918 | Scott | 24/134 R |
| 1,413,616 | 4/1922 | Rock | 24/134 R |
| 1,580,731 | 4/1926 | Horne | 294/104 |
| 1,809,566 | 6/1931 | Ott | 24/134 R |
| 2,561,514 | 7/1951 | Houseman | 24/134 R |
| 2,627,834 | 2/1953 | Roberts | 24/134 R |
| 3,179,994 | 4/1965 | Meyer | 24/134 R |
| 3,386,530 | 6/1968 | Thompson | 24/134 R |
| 3,395,892 | 8/1968 | Ratcliff | 24/134 E |

*Primary Examiner*—Bernard A. Gelak
*Attorney, Agent, or Firm*—H. Dale Palmatier; James R. Haller

[57] ABSTRACT

A safety clamp for releasably attaching a workman's safety belt to an upright safety rope. The clamp includes a portable rope housing having a generally U-shaped cross section in which the safety rope rides, a brake lever having a brake shoe at one end and a handle at the other end and adapted to pivot about an intermediate pivot point, and a spring-loaded, removable pivot pin rotationally locked to the brake lever and pivotally joining the latter to the rope housing so that the brake shoe is movable into and out of contact with a rope in the housing. A helical spring carried at one end of the pivot pin acts in torsion to urge the brake shoe into contact with the rope and acts in compression to retain the pin in operating position. In use, the housing and brake lever are readily assembled by means of the pivot pin about an upright safety rope, and the handle of the brake lever is attached to a workman's safety belt. Upward movement of the outwardly extending handle of the brake lever permits the housing to slide upwardly on the safety rope. When upward movement ceases, the brake shoe is spring biased into contact with the rope. Should a workman fall, his weight acting downwardly upon the outwardly extending handle of the brake lever causes the brake shoe to press inwardly with great force against the rope, pinching the rope in the housing and thus preventing the housing from sliding downwardly on the rope.

9 Claims, 4 Drawing Figures

PATENTED DEC 10 1974 3,852,943
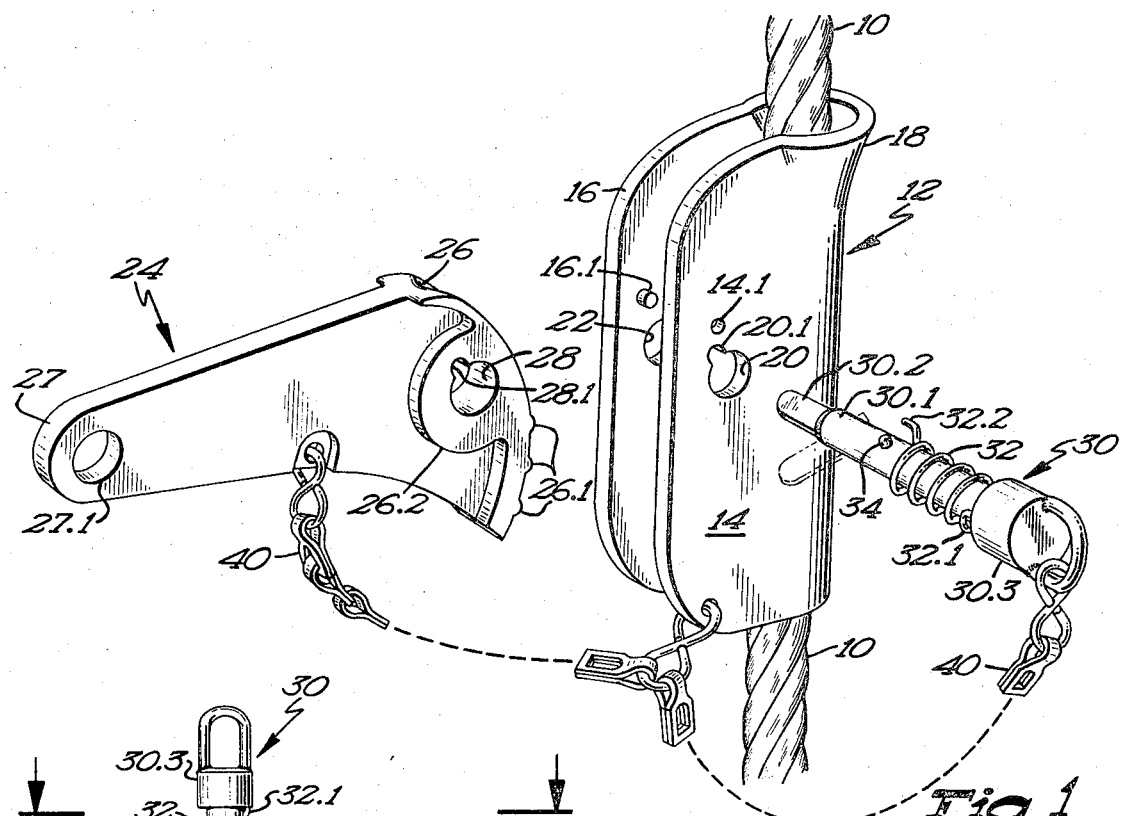
Fig 1
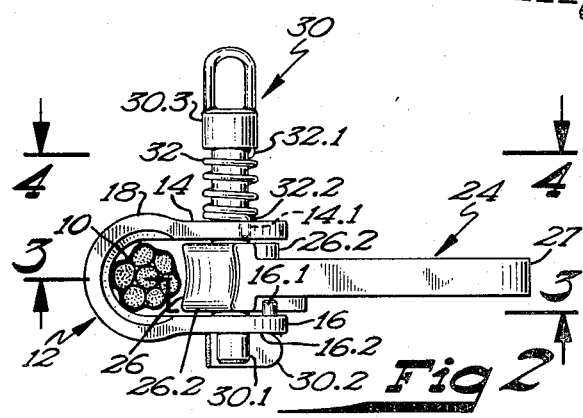
Fig 2
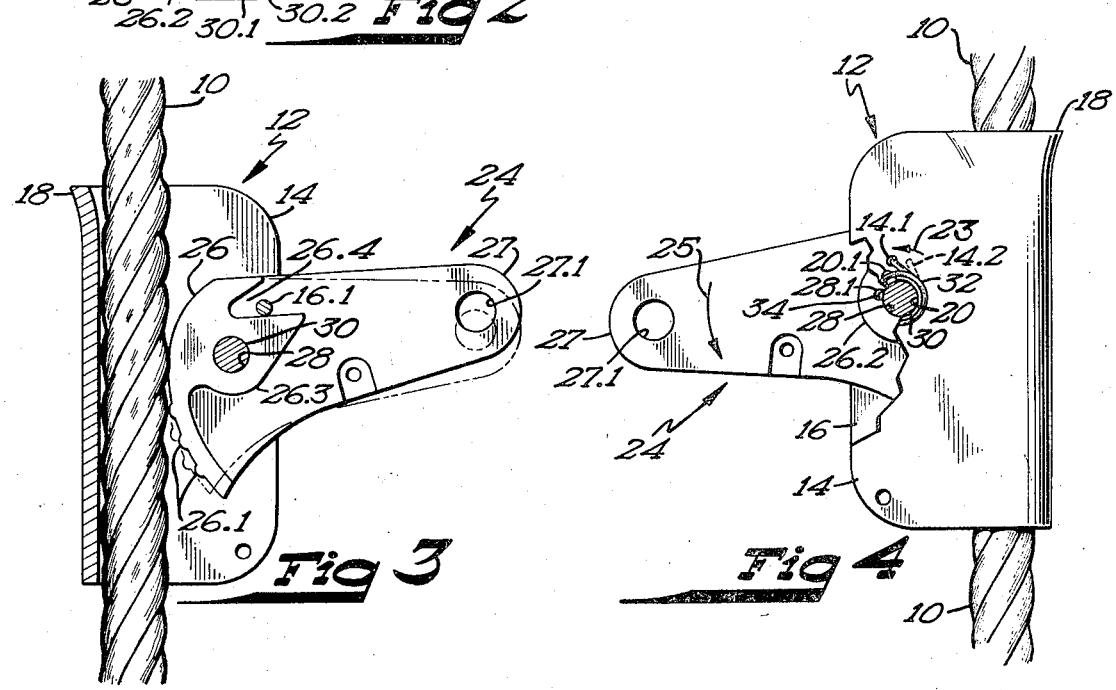
Fig 3
Fig 4

PORTABLE SAFETY CLAMP

BACKGROUND OF THE INVENTION

Workmen such as repairmen for tall light towers who work at precariously high positions have employed a variety of safety devices to minimize the dangers of accidental falls. A substantially vertical safety rope often is employed, a safety belt of the workman being fastened to the safety rope by devices such as those described in U.S. Pats. Nos. 3,179,994 and 3,317,971.

BRIEF SUMMARY OF THE INVENTION

The present invention provides a rugged and reliable safety clamp for connecting a workman's safety belt to an upstanding safety rope. Briefly, the safety clamp of the invention includes an elongated, portable rope housing having opposed walls and a generally U-shaped cross section, the housing interior being adapted to longitudinally receive a safety rope. A brake lever is provided having an intermediate pivot point and having a brake shoe on one end and a handle at the other end for attachment to a workman's safety belt. A removable pivot pin is provided to pivotally fasten the brake lever to the rope housing with the brake shoe movable into and out of contact with a rope in the housing as the handle of the lever is moved downwardly and upwardly, respectively. The pivot pin includes spring means normally biasing the brake shoe into contact with a rope in the rope housing.

BRIEF DESCRIPTION OF THE DRAWING

FIG. 1 is a perspective, exploded view of the safety clamp of the invention;

FIG. 2 is a top view of a clamp of the invention shown mounted about a safety rope but not gripping the rope;

FIG. 3 is a broken away view in partial cross section taken along lines 3—3 of FIG. 2; and FIG. 4 is a side view of a clamp of the invention, shown in partial cross section and partially broken away, taken generally along lines 4—4 of FIG. 2.

DETAILED DESCRIPTION OF THE PREFERRED EMBODIMENT

Referring first to FIG. 1, a cast housing denoted generally as 12 comprises a folded metal plate providing approximately parallel, opposed vertical walls 14 and 16 and a substantially U-shaped cross section in which an upright safety cable or rope 10 may ride. Metal safety cables ordinarily are about three-eighths of an inch in diameter, while safety ropes of manila or the like may be three-fourths of an inch in diameter. The terms "ropes" and "cables" are employed interchangeably herein, and both are embodied herein in the term "rope." The housing has an outwardly flared upper end 18 (FIG. 2) to enable the housing to slide upwardly on the rope without binding. The opposed side walls 14 and 16 of the housing have first and second bearing apertures 20 and 22 respectively therethrough.

A brake lever, designated generally as 24, is provided with a brake shoe 26 at one end and a pivot point intermediate its length in the form of an orifice 28 therethrough. The brake shoe 26 has an outer rope-contacting surface 26.1 which may be roughened by transverse ridges or knurls to promote slip-free contact with the rope and which is eccentric with respect to the orifice 28 so that the surface swings inwardly to contact the rope when the other end, or handle, 27 of the brake lever is depressed. The orifice 28 is aligned between the bearing apertures 20 and 22 of the rope housing 12. To reduce the lateral "play" the sides of the brake lever and the inner surfaces of the walls 14 and 16 of the rope housing, the thickness of the brake lever in the area of the orifice 28 and the brake shoe 26 is increased over the thickness of the lever at its handle end 27. This greater thickness also increases the rope-contacting surface 26.1 of the brake shoe 26. The handle end 27 of the brake lever is provided with a hole 27.1 through which a connecting ring or the like may be passed for attaching the brake lever to the safety belt of a workman.

The brake lever is pivotally mounted to the rope housing 12 by a pivot pin 30 which passes through the first bearing aperture 20 of the rope housing, thence through the orifice 28 of the brake lever and through the second bearing aperture 22 of the housing. The pivot pin is provided at one end 30.1 with a pivotally mounted latch 30.2. When the pivot pin has been thrust through both bearing apertures, the latch is pivoted transversely to the pin axis to bear upon the outer periphery 16.2 of the bearing aperture 22, thus preventing the pin from being pulled back through that aperture.

The pivot pin 30 includes a helical spring 32 thereabout, one end 32.1 of the spring being affixed as by welding to the head 30.3 of the pivot pin. The other free end 32.2 of the spring is bent parallel to the axis of the pivot pin and is adapted to slide along the outer housing wall 14 for insertion in hole 14.1 in the wall. When the latch 30.2 is turned transversely of the pivot pin axis, the helical spring is maintained in compression to urge the latch 30.2 securely against the outer surface 16.2 of the bearing aperture 22.

The orifice 28 of the brake lever has a transverse keyway 28.1 in the periphery thereof which extends at least partially through the lever. During assembly of the safety clamp, a key 34 which is borne on the surface of the pivot pin enters the keyway 28.1 and rotatably locks the pivot pin and the brake lever together so that the pin and lever rotate substantially as one unit, although some rotational "play" between the pin and the brake lever is desired, as will be subsequently explained. Before the key 34 can enter the keyway 28.1 in the brake lever, however, the key must first pass through another keyway 20.1 in the first bearing aperture 20 of the rope housing (FIG. 1). The keyways and key, and the helical spring, cooperate to provide the clamp with a "fail-safe" feature, and the cooperation of these parts may be described as follows:

Alignment of the keyways in the brake lever and the rope housing is affected only when the brake lever is in its extreme upright or open position, as shown in solid lines in FIG. 3. When the keyways have been thus aligned, the pivot pin 30 may be inserted through the bearing apertures 20 and 22 and the bearing orifice 28, the key 34 of the pivot pin passing through the keyway 20.1 of the rope housing into the keyway 28.1 of the brake lever. Referring to FIG. 4, the free end 32.2 of the helical spring does not then engage the hole 14.1 in the rope housing, but rather engages the outer surface of the rope housing 14.2 at a point spaced from the hole 14.1. As the pivot pin is fully inserted, the helical spring 32 is compressed, and the turning down of the latch 30.2 of the pivot pin retains the helical spring in compression and locks the latch against the outer surface of the bearing aperture 22. The head 30.3 of the pivot pin is then manually rotated in a direction (shown by arrow 23 in FIG. 4) tending to depress the handle 27 of the brake lever. This rotation of the pivot pin also causes the free end 32.2 of the helical spring to slide across the outer surface of the rope housing in the direction of the hole 14.1. As the pin is thus rotated, the brake shoe is brought into contact with the rope in the rope housing. Continued rotation of the pin, which is permitted by the slight rotational "play" between the pin and the lever, moves the free end of the helical spring into alignment with the hole 14.1 in the rope housing, whereupon the spring end snaps into the hole and is restrained from further rotational movement in either directon around the axis of the pivot pin. Thus, in bringing the free end of the helical spring into alignment with the hole 14.1 in the housing, the pivot pin is rotated slightly beyond the position in which the brake shoe is first brought into contact with the rope. Once the free spring end has become seated in the hole 14.1, the helical spring continuously urges the brake shoe against the rope.

As the pivot pin is thus rotated to cause the brake shoe to contact the rope, the keyway 28.1 of the brake lever with the pivot pin key 34 captured therein is carried rotationally out of alignment with the keyway 20.1 in the wall 14 of the rope housing. The mis-alignment of the keyways prevents the pivot pin from sliding out of the bearing orifice 20 in the housing wall 14. The torsional pressure exerted by the helical spring upon the brake lever maintains the mis-alignment of the keyways, and also maintains at least a light pressure of the brake shoe against the safety rope 10. The helical spring thus acts both in compression to retain the latch member 30.2 of the pivot pin in a locked position and in torsion to maintain the brake lever in a rope-contacting position which also maintains mis-alignment between the keyways 28.1 and 20.1.

In use, the handle 27 of the clamp is attached to the safety belt of a workman by means of a connecting ring or the like. The clamp itself is mounted on a safety rope which in turn is supported at its top and bottom so as to be in close proximity to the rungs of a vertical ladder which the workman will climb. The safety clamp is maintained in position on the safety rope against falling under its own weight by the constant pressure against the rope of the brake shoe which in turn is under continuous torsional pressure by the helical spring. As the workman climbs the ladder, the handle 27 of the brake lever is pulled in an upwardly direction. The upward pressure on the handle 27 relieves the pressure of the brake shoe against the rope, and permits the rope housing to slide upwardly on the rope. The helical spring, however, exerts sufficient downward pressure on the handle 27 of the brake lever as to prevent the brake lever from moving to its uppermost position with respect to the rope housing. Instead, the brake lever ordinarily is raised with respect to the housing just enough to permit the safety rope to slide freely through the housing. In this manner, the keyways 20.1 and 28.1 are prevented from becoming aligned during use of the clamp.

When the workman descends the ladder, he leans inwardly towards the rope housing to bias the handle of the brake lever slightly upwards so that the housing may pass downwardly on the rope. It should be noted that if no upward or downward pressure is exerted on the brake lever handle 27, the helical spring will cause the brake shoe to come into contact with the rope. Should a workman fall from the ladder, the resultant downward pressure exerted on the brake lever handle 27 causes the brake shoe to dig firmly into the safety rope, positively capturing the rope between the inner surface of the rope housing and the brake shoe and preventing further downward movement of the clamp.

To remove the safety clamp from the safety rope, the handle 27 of the brake lever is manually forced into its uppermost position to align the keyways 20.1 and 28.1 Simultaneously, axial pressure is exerted against the pivot pin 30 so as to more fully compress the helical spring and permit the latch 30.2 to be aligned with the axis of the pivot pin. While maintaining the brake lever handle 27 in its uppermost position, the pivot pin is withdrawn from the bearing apertures 20 and 22 and the bearing orifice 28 of the brake lever. As the key 34 clears the keyway 20.1 in the wall 14 of the housing, the upward pressure on the brake handle may be released, permitting the pivot pin to rotate under the torsional pressure of the helical spring, whereupon the free end 32.2 of the helical spring may escape readily from the hole 14.1 in the housing wall. Complete extraction of the pivot pin from the rope housing permits the brake lever 24 to be disengaged and removed from the housing as well, whereupon the housing itself may be removed from the rope for attachment to a different rope, or for storage, etc. The rope housing, brake lever and pivot pin may be loosely connected by a chain 40 to prevent mislaying of any of these main parts when disassembled. It will be evident from the foregoing that the workman must use two hands to remove the safety clamp of the invention from the safety rope, and this is a desirable feature of the invention since it precludes removal of the clamp from the safety rope except with the actual intent of the workman; that is, accidental removal of the clamp from the rope is avoided.

Manifestly, I have provided a portable safety clamp which can be easily moved from one safety rope to another, which is simple to operate, inexpensive to produce, and which is highly reliable. A key and keyway assembly of the three main parts of the clamp (rope housing, brake lever and pivot pin) provide a fail-safe feature which holds the pivot pin in functioning position in the clamp even if the helical spring should break or if the end latch of the pivot pin malfunctions.

While I have described a preferred embodiment of the present invention, it should be understood that various changes, adaptations, and modifications may be made therein without departing from the spirit of the invention and the scope of the appended claims.

What is claimed is:

1. A portable safety clamp for connection of a workman's safety belt to an upstanding safety rope, the clamp comprising an elongate portable rope housing having a generally U-shaped internal cross section adapted to longitudinally receive a safety rope and having opposed, apertured walls; an elongate brake lever having a bearing orifice intermediate its length and having a brake shoe at one end extending inwardly of the housing for contact with a rope therein, the other end of the brake lever extending outwardly for connection to a workman's safety belt; a removable pivot pin extending through the bearing orifice and the wall apertures; a helical spring mounted about one end of the pivot pin for acting in torsion to urge the brake shoe into contact with a rope in the housing; the pivot pin having a releasable latch at its other end abutting the outer surface of a housing wall aperture and held lockingly thereagainst by the compressive force of the helical spring.

2. The safety clamp of claim 1 including means for rotationally locking together the pivot pin and brake lever, and wherein one end of the helical spring is affixed to the pin adjacent the one end of the pin and the other end of the spring is removably attached to the rope housing, whereby movement of the brake shoe out of contact with the rope in the housing creates torsion forces in the helical spring tending to return the brake shoe into contact with the rope.

3. The safety clamp of claim 2 wherein the bearing orifice has a lateral keyway therein receiving a key borne by the pivot pin for rotationally locking the pivot pin to the brake lever, and wherein the housing wall aperture adjacent the one end of the pivot pin has a keyway therein which is aligned with the keyway in the brake lever orifice only when the brake lever is pivoted to an extreme open position not assumed by the lever during operation of the clamp, whereby the pivot pin is continuously locked to the brake lever when the keyways are not aligned.

4. A safety clamp for attachment of a workman's safety belt to an upright safety rope, comprising an upright, portable, rigid rope housing having opposed walls and a generally U-shaped cross section for reception of an upright safety cable, one wall having a first bearing aperture therethrough, and the opposed wall having a second bearing aperture aligned with the first aperture;

a brake lever having a bearing orifice intermediate its ends aligned with the first and second bearing apertures of the rope housing, the lever having a brake shoe at one end extending into the rope housing, the other end of the brake lever being adapted for attachment to a workman's safety belt; and a removable pivot pin passing through the first bearing aperture, the brake lever orifice, and the second bearing aperture, the pin being rotatably locked to the brake lever, one end of the pin having a pivotally mounted latch movable transversely of the pin axis to bear upon the outer periphery of the second bearing aperture to prevent removal of the pin therefrom in the direction of the first aperture, the other end of the pin having a helical spring therearound of which one end is rigidly attached to the pin and the other end is removably attached to the rope housing, the spring serving to simultaneously act in compression to maintain the pin latch against the outer periphery of the second bearing aperture and to act in torsion to normally urge the brake shoe into engagement with a rope housed in the rope housing.

5. The safety device of claim 4 wherein the brake lever orifice and the first bearing aperture each have transverse keyways which are aligned only when the brake lever is rotated to an extreme open position not assumed by the brake lever during use of the safety clamp, and which are maintained in non-alignment by torsional pressure of the helical spring urging the brake shoe into contact with the rope, th pivot pin having a key adapted to pass through the keyway in the first aperture and to seat in the keyway in the brake lever orifice for rotationally locking the pivot pin to the brake lever, whereby removal of the pin accidentally from the housing is prevented.

6. The safety clamp of claim 5 wherein the helical spring has one end affixed to the pivot pin and its other end generally aligned with the axis of the pivot pin and adapted to be captured by a hole in the housing wall adjacent the first bearing aperture, the free spring end and the hole being relatively positioned so that the spring urges the brake shoe against the rope when the free spring end is retained in the hole in the housing wall.

7. A safety clamp for attachment of a workman's safety belt to an upright safety rope, comprising an upright, portable, rigid rope housing having opposed walls and a generally U-shaped cross section for reception of an upright safety rope, one wall having a first bearing aperture therethrough and the opposed wall having a second bearing aperture therethrough aligned with the first aperture;

a brake lever having an orifice intermediate its ends aligned between the first and second bearing apertures of the rope housing, the brake lever having a brake shoe at one end extending into the rope housing for contact with a safety rope therein, the other end of the brake lever being adapted for attachment to a workman's safety belt; and a removable pivot pin passing through the first and second bearing apertures and the brake lever orifice, the pivot pin having a key adapted to pass through a keyway in the first bearing aperture and to be received in a keyway in the periphery of the brake lever orifice to rotatively lock the pivot pin to the brake lever and to prevent removal of the pivot pin from the first bearing aperture when the keyways are mis-aligned, but to permit removal of the pin when the keyways are aligned by rotation of the brake lever to an extreme open position, the pivot pin having a helical spring therearound of which one end is affixed to the pin and the other end is removably attached to the rope housing, the spring acting in torsion to urge rotation of the pivot pin to carry the brake lever shoe into engagement with the safety rope.

8. The safety clamp of claim 7 wherein the other end of the pivot pin includes a pivotally mounted latch movable transversely of the pin axis to bear upon the outer periphery of the second bearing aperture and prevent removal of the pin therefrom, the latch holding the helical spring in compression, and the spring retaining the latch in its transverse position.

9. A portable safety clamp for connection of a workman's safety belt to an upstanding safety rope, the clamp comprising an elongate portable rope housing having a generally U-shaped internal cross section adapted to longitudinally receive a safety rope and having opposed, apertured walls with a keyway in one of the apertures; an elongate brake lever having a bearing orifice intermediate its length with a keyway in the orifice, the brake lever having a brake shoe at one end extending inwardly of the housing for contact with a rope therein, the other end of the brake lever extending outwardly for connection to a workman's safety belt; a removable pivot pin extending through the bearing orifice and wall apertures, the pivot pin including a key receivable in the keyway of the pivot pin for rotationally locking the pivot pin to the brake lever; spring means carried by the pivot pin and normally biasing the brake shoe into contact with a rope in the housing; the keyway in the bearing aperture being oriented for alignment with the keyway in the brake lever orifice only when the brake lever is pivoted to an extreme open position not assumed during operation of the clamp, thus locking the pivot pin in the brake lever orifice when the safety clamp is in use.

* * * * *